3,801,519
AQUEOUS SUSPENSION POLYMERIZATION IN THE PRESENCE OF $C_3$–$C_4$ HYDROXYALKYL CARBOXYMETHYL CELLULOSE ETHERS AS DISPERSING AGENTS

Terry A. Brodof, Lincroft, N.J., assignor to The Dow Chemical Company, Midland, Mich.
No Drawing. Continuation-in-part of abandoned application Ser. No. 100,389, Dec. 21, 1970. This application Sept. 21, 1972, Ser. No. 290,890
Int. Cl. C08f 1/09, 1/11
U.S. Cl. 260—17 R     3 Claims

ABSTRACT OF THE DISCLOSURE $C_3$–$C_4$ hydroxyalkyl carboxymethyl cellulose ethers having a $C_3$–$C_4$ hydroxyalkyl MS of from about 0.2 to 2.5 and a carboxymethyl DS of from about 0.1 and 0.9 are superior protective colloids in the non-emulsified aqueous suspension polymerization of vinyl chloride.

This application is a continuation-in-part of the now abandoned application Ser. No. 100,389, filed Dec. 21, 1970.

BACKGROUND

It is known that vinyl chloride monomer can be polymerized in aqueous suspension in the presence of one of a number of natural and synthetic polymers which function as protective colloids in the polymerization process to provide products of desirably uniform particle size distribution. Exemplary of such prior known protective colloids or dispersing agents are the methyl hydroxypropyl cellulose materials as described in U.S. Pat. No. 2,538,051, as well as the methylcellulose, polyvinylalcohol and gelatin. These polymers, due to their surface activity in water are capable of dispersing and stabilizing water-immiscible monomers in water and may be classified as weak polymeric surfactants. Like a surfactant, they function by lowering the interfacial tension between monomer and water, thereby permitting the stabilized monomer to polymerize in a distinct size distribution.

Of the cellulosic ethers presently available only methylcellulose and hydroxypropyl methylcellulose have been widely accepted for use in polymerization of the substantially water-insoluble monoethylenically unsaturated monomeric materials such as vinyl chloride. Of the other available cellulosic ethers, the hydroxyethyl cellulosics lack the necessary surfactancy and the hydroxypropyl cellulosics gel at too low a temperature to be effective.

Further, the methylcellulosics and hydroxypropyl methylcellulosics also gel at low temperatures which limits the use of these materials to polymerizations which occur at temperatures below their gel point during the early stages of the reaction cycle when the particle size of the polymeric product is determined. Still further, the prior known methylcellulosics and hydroxypropyl cellulosics, due to their pronounced surfactant properties, cause excessive foaming during the polymerization reaction.

It is, therefore, a primary object of this invention to provide a cellulosic protective colloid which displays the desirable combination of adequate surfactant properties without undesirable foaming or thermal gelling, thus permitting the exclusion of antifoaming materials along with allowing the overall polymerization reaction cycle to be shortened through the use of higher polymerization temperatures.

SUMMARY OF THE INVENTION

The above and related objects are obtained by utilizing as a protective colloid, in the nonemulsified aqueous suspension polymerizaiton of substantially water-insoluble monoethylenically unsaturated monomeric materials, from about 0.05 to 5 percent, based on monomer weight of a water-soluble $C_3$–$C_4$ hydroxyalkyl carboxymethyl cellulose ether having a $C_3$–$C_4$ hydroxyalkyl MS of from about 0.2 to 2.5 and a carboxymethyl DS of from about 0.1 and 0.9.

DESCRIPTION OF THE PREFERRED EMBODIMENTS

The hydroxyalkyl carboxymethyl cellulose ethers used in the process of the present invention can be prepared by propylene oxide or butylene oxide hydroxyalkylation of a carboxymethyl cellulose having a requisite carboxymethyl DS. Alternately, finely divided alkali cellulose can be reacted in one stage with a mixture of sodium chloroacetate or chloroacetic acid and a $C_3$–$C_4$ alkylene oxide, or in a separate two stage reaction. The organic diluent slurry process of the Klug U.S. Pat. 2,618,632 and 3,357,971 can be used as well as other dry and aqueous cellulose ether processes. Optimum results are obtained with a fairly uniform distribution of the substituent hydroxyalkyl and carboxymethyl groups in the cellulose ether.

As described, the suitability of these protective colloids depends on the substitution of the cellulose ether. Thus, the contemplated ethers have a $C_3$–$C_4$ hydroxyalkyl molar substitution (MS) of between about 0.2 and 2.5 and a carboxymethyl degree of substitution (DS) of from about 0.1 and 0.9.

The molecular weight of the cellulose ether, as shown by the standard 2 percent aqueous solution viscosity at pH 7.0 and 20° C., may range from about 10 to 500 without significant effect on its effectiveness as as protective colloid in the process of the present invention.

As described herein, the prescribed $C_3$–$C_4$ hydroxyalkyl carboxymethyl cellulose ethers are particularly effective as protective colloids or dispersing agents, for the polymerization of vinyl chloride monomer, although such materials are also useful in the polymerization of any substantially water-insoluble monoethylenically unsaturated monomer such as vinylidene chloride; vinyl alkanoates such as vinyl acetate, vinyl propionate and the like and acrylonitrile and methacrylonitrile, and mixtures thereof.

Obtainment of desired polymer particle size may be realized utilizing the prescribed cellulose ethers in a concentration ranging generally from about 0.05 to 5 percent based on the weight of monomer used.

Further, as in usual aqueous suspension polymerization reactions of the type contemplated herein, the polymerization proceeds in the presence of a polymerization catalyst. In this regard, the catalyst isopropyl percarbonate has been found to be particularly effective, however any conventionally used free radical generating polymerization catalyst selected from a wide range of peroxides, such as hydrogen peroxide and lauroyl peroxide, and the percarbonates may be used.

The following example further illustrates the present invention and its advantages. Unless otherwie specified all parts and percentages are by weight.

EXAMPLE

In each of a series of individual experiments a one gallon glass reactor fitted with a stainless steel agitator and a pressure release valve was first purged with nitrogen. Thereafter 1160 grams of water, 140 grams of a 0.75 percent solution of the hereafter identified cellulosic material in water and 0.6 gram of a 25 percent solution of the catalyst isopropyl percarbonate in xylene was added. The pressure within the reactor was raised to 30 p.s.i. with nitrogen and vented, and the procedure repeated three times. A partial vacuum was then created in the reactor and 600 grams of vinyl chloride added. The reactor temperature was brought to 56° C. over a 20-minute period and the reaction allowed to proceed at this temperature for a period of 5 to 6 hours while maintaining a pressure of about 120 p.s.i.

At the end of the reaction cycle the polymerized vinyl chloride was removed from the reactor, washed with water then filtered and dried overnight at 50° C.

The following Table I identifies the cellulosic materials used and describes the polymerization reaction and resulting polymer.

TABLE I

| Sample No. | Cellulosic protective colloid used Type | Viscosity (cps.) | Thermal gel point | Foaming | Percent yield of polymer | Polymer bulk density (gm./cc.) |
|---|---|---|---|---|---|---|
| For comparison | | | | | | |
| 1 | Hydroxypropyl methylcellulose ether | 50 | Yes | Excessive | 63 | 0.488 |
| 2 | Carboxymethyl cellulose | 150 | | | (¹) | |
| The invention: | | | | | | |
| 3 | Hydroxypropyl carboxymethyl cellulose, 0.69 HP (MS) substitution and 0.40 CM (DS) substitution. | 533 | None | Slight | 73 | 0.534 |
| 4 | Hydroxypropyl carboxymethy cellulose, 0.81 HP (MS) substitution and 0.61 CM (DS) substitution. | 218 | do | do | 73 | 0.650 |
| 5 | Hydropropyl carboxymethyl cellulose, 1.05 HP (MS) substitution and 0.89 CM (DS) substitution. | 136 | do | do | 70 | 0.481 |
| 6 | Hydroxypropyl carboxymethyl cellulose,1.23 HP (MS) substitution and 0.64 CM (DS) substitution. | 465 | do | do | 74 | 0.549 |
| 7 | Hydroxypropyl carboxymethyl cellulose, 1.95 HP(MS) substitution and 0.50 CM (DS) substitution. | 12 | do | do | 75 | 0.556 |

¹ Reaction set-up.

The above data illustrate the unexpected effectiveness of the hydroxypropyl carboxymethyl cellulose materials as contrasted with a hydroxypropyl methylcellulose ether and a nonsubstituted carboxymethyl cellulose ether; as protective colloids in the polymerization of vinyl chloride.

By way of further comparison hydroxypropyl carboxymethyl cellulose materials having a carboxymethyl DS in the range of about .01 or below were incapable of preventing excessive foaming during the polymerization of vinyl chloride monomer by the technique as described herein.

The vinyl chloride polymers prepared by the process comprising the present invention are useful for a wide range of applications including formation of molded or extruded articles or as coatings and the like.

What is claimed is:

1. In the process of polymerizing vinyl chloride monomer in non-emulsified aqueous suspension in the presence of a free radical generating polymerization catalyst and a protective colloid the improvement consisting of: using as said protective colloid from about 0.005 to 5 percent, based on monomer weight of a water-soluble $C_3$-$C_4$ hydroxyalkyl carboxymethyl cellulose ether having a $C_3$-$C_4$ hydroxyalkyl molar substitution of between about 0.2 to 2.5 and a carboxymethyl degree of substitution of between about 0.1 and 0.9.

2. The process of claim 1 wherein the hydroxyalkyl group is hydroxypropyl.

3. The process of claim 2 wherein the cellulose ether has a hydroxypropyl molar substitution of from about 0.69 and 1.95 and a carboxymethyl degree of substitution of from about 0.40 to 0.89.

References Cited
UNITED STATES PATENTS

| 2,618,632 | 11/1952 | Klug | 260—231 R |
| 3,290,265 | 12/1966 | Kaneko | 260—29.6 RB |
| 3,357,971 | 12/1967 | Klug | 260—215 |
| 3,499,850 | 3/1970 | Kinzie | 260—17 R |
| 3,701,742 | 10/1972 | Richardson et al. | 260—17 R |

LUCILLE M. PHYNES, Primary Examiner

U.S. Cl. X.R.

260—87.5 R, 87.7, 85.5 XA. N. 92.8 W